United States Patent [19]

Smith

[11] Patent Number: 5,640,560
[45] Date of Patent: Jun. 17, 1997

[54] CD-ROM CONTENT REPURPOSING

[75] Inventor: Matthew W. Smith, Tulsa, Okla.

[73] Assignee: Microsoft Corporation, Redmond, Wash.

[21] Appl. No.: 510,263

[22] Filed: Aug. 2, 1995

[51] Int. Cl.⁶ .................................................. G06F 17/30
[52] U.S. Cl. ............................................................ 395/615
[58] Field of Search ....................................... 395/611, 612, 395/613, 614, 615, 761, 762, 792

[56] References Cited

U.S. PATENT DOCUMENTS

| | | | |
|---|---|---|---|
| 5,446,891 | 8/1995 | Kaplan et al. | 395/615 |
| 5,463,771 | 10/1995 | Sotoyanagi et al. | 395/615 |
| 5,530,856 | 6/1996 | Dahod et al. | 395/615 |
| 5,557,785 | 9/1996 | Lacquit et al. | 395/615 |

*Primary Examiner*—Thomas G. Black
*Assistant Examiner*—Ruay Lian Ho
*Attorney, Agent, or Firm*—Ronald M. Anderson

[57] ABSTRACT

A multimedia work stored on a CD-ROM is repurposed at run time to include changes and additions to the original work. Files required for repurposing the multimedia work are distributed on a floppy disk or CD-ROM for installation on the user's hard drive (16) prior to execution of the multimedia work on a personal computer (10). A run-time version of an authoring program employs one of the files for repurposing that includes references to objects/pages used in the repurposed multimedia work. Since objects communicate with the run-time authoring program through a node (89) and a filter (88), changes to the interaction between objects and the system are readily implemented by replacing the previous filter with a new filter. However, a filter is not required if the repurposing only replaces one object that was in the original work with a different object having the same label. Furthermore, because the objects and pages used in the multimedia work are not "hard wired" in a compiled executable file that is implemented when the work is played, late binding of the objects and other elements permits seamless modification of the work at run time.

25 Claims, 5 Drawing Sheets

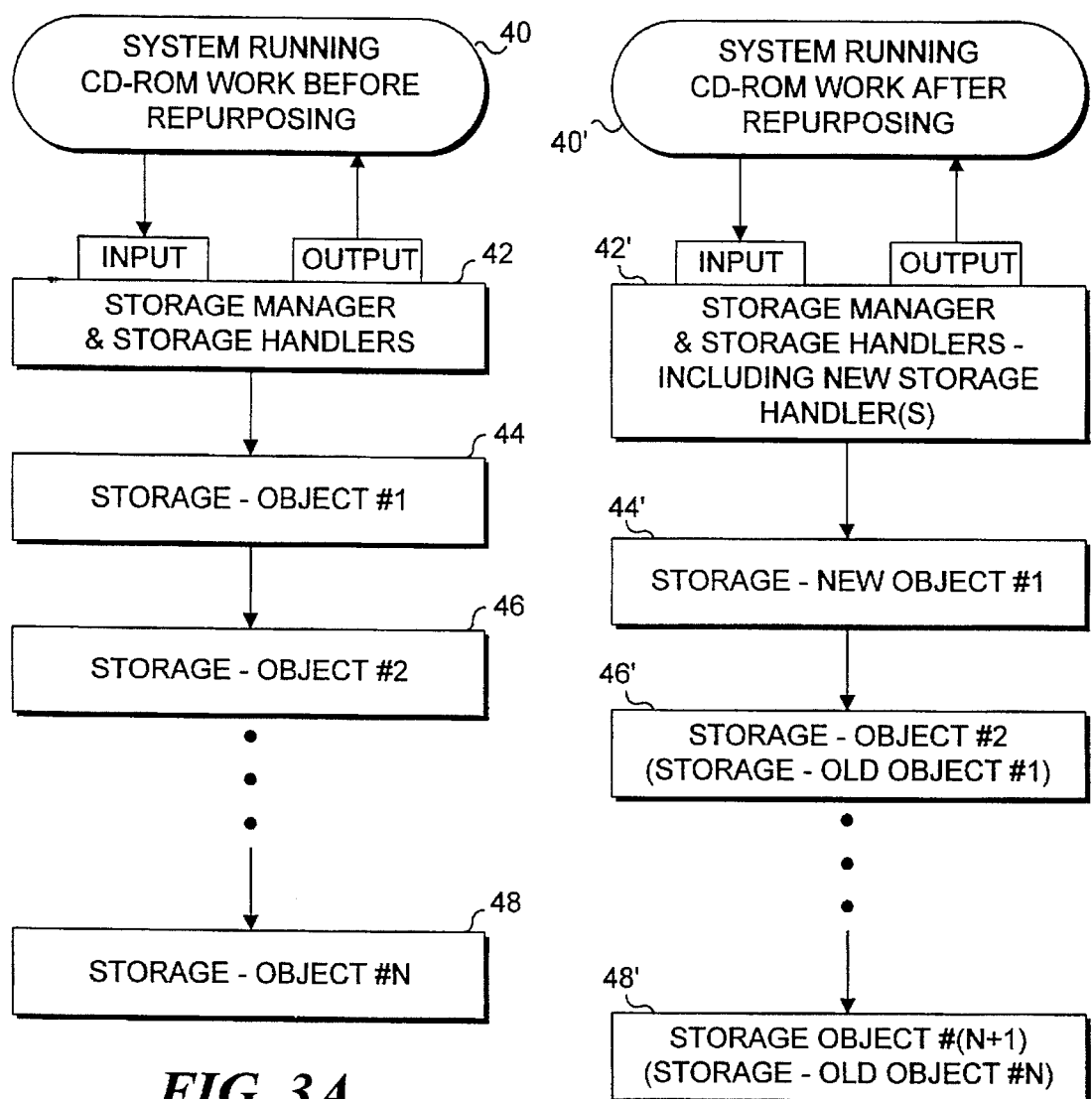
*FIG. 3A*
*FIG. 3B*
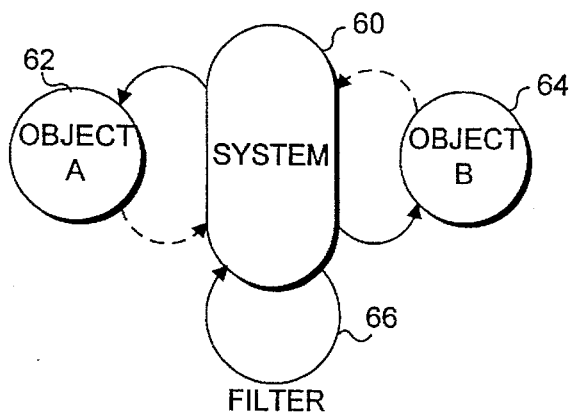
*FIG. 4A* (PRIOR ART)
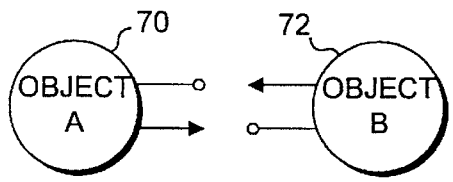
*FIG. 4B* (PRIOR ART)

CD-ROM CONTENT REPURPOSING

FIELD OF THE INVENTION

This invention relates to a method and system for modifying a multimedia work that is stored on a compact disk-read only memory (CD-ROM), and more specifically, for modifying the multimedia work when it is executed on a computer.

BACKGROUND OF THE INVENTION

The term "multimedia" as used herein refers to computer programs that combine audio and visual components in a single work. These components can be in the form of videos that run in a window on the computer display screen, animations, still images and other graphic images (photographic or computer generated), Red Book audio (sound in conventional music CD format), wave files (digitized sound), and/or MIDI files, which are used to produce music or other sounds by controlling a sound board in the computer, external music synthesizer, or other hardware. Multimedia components can be combined in unlimited ways by an author to create many different types of works; such works are typically intended for informational, educational, and/or entertainment purposes.

Because a single multimedia work often includes hundreds of megabytes of data, the current most popular storage and distribution medium for such works is the CD-ROM. Typically, once a multimedia work is finalized, a master CD-ROM is "burned" on which the entire work is stored. Subsequently, the master CD-ROM is used to produce the CD-ROMs actually distributed to end users who lease the multimedia work for play. Currently, the CD-ROM technology does not normally permit changes to be made to the CD-ROMs that will be distributed. A CD-ROM is essentially a write once, read many times storage medium. Thus, it is generally not possible to make changes in or additions to a multimedia work stored on a conventional CD-ROM. Furthermore, it is unusual for changes or additions to a computer program to be easily made without recompiling the program or changing the source code, if the code is in a language that is normally executed by an interpreter. For these reasons, changes or additions to a multimedia work recorded on a CD-ROM normally require that the disk be replaced with a new one on which the revised or added content is included.

While the cost of a replacement CD-ROM is only a few cents to a software publisher, it is likely that if the changes or additions to a multimedia work could be made with files of one to two megabytes or less in size, the changes could be distributed to end users on floppy disks, or downloaded via a modem. Using such files, a user could easily update the multimedia work. Updating a work in this manner would be both more convenient and would enable a limited segment of the total audience to customize a title, thereby providing enhanced convenience. However, current techniques and authoring programs for producing files that are executed to play a multimedia work do not provide for repurposing the work with subsequently added external files. Although the term "hard wired" is most often used in connection with hardware components, it is also applicable to the prior art systems conventionally used for creating and playing multimedia works, in that such systems and techniques do not permit changes in a multimedia work at run time. While it is true that multimedia works written with the intent of accessing a plurality of add-on files, for example, by selecting a file from a menu, can change when they play, these changes must be "hard wired" in the work when it is stored on the CD-ROM. For example, Microsoft Corporation's "Golf for Windows" is distributed on a CD-ROM and was specifically written to include a provision for enabling the game to be played on a golf course selected from a list of available courses stored on the user's hard drive, which are sold as accessories or add-ons to the basic game. However, multimedia works that are not written with the facilities for selecting and using added files cannot generally be subsequently modified to enable such changes or additions. Furthermore, even such multimedia works as Golf for Windows can only be adapted in the manner specifically contemplated at the time the work was compiled and stored on the CD-ROM. The game cannot be modified during play, for example, to insert a "Caddy" that offers advice on the club that should be chosen for hitting the golf ball in a particular situation.

As used throughout this specification and in the claims that follow, the term "repurposing a multimedia work" means modification of the work after it is stored on a non-volatile storage medium (e.g., a CD-ROM) in a manner that was not specifically provided for in the work when created. Repurposing a multimedia work is thus substantially different than providing for specific add-on features at the time the work was created.

There are numerous instances where, following the release and commercial success of a multimedia work, it becomes evident that there is a market for more features or functions. For instance, in an educational multimedia work, the users may request that additional information be provided about certain topics in the multimedia work. Thus, a multimedia work dealing with Introductory Biology might be expanded by adding more detailed modules related to specific topics, such as the "Reproductive Systems Of Mammals" that are only generally covered in the multimedia work. The modules might be distributed on additional CD-ROM disks, a tape, or on floppy disks, depending upon the size of the module. By integrating such modules into the original multimedia work, much of the programming effort in the work that is devoted to presenting the topic could be used in connection with the modules, and duplication of content could be avoided. In addition, the integration of follow-up modules to repurpose the original multimedia work would provide a more seamless presentation of the subject. The system and/or method that enables such repurposing should be relatively broad in its ability to integrate changes and additions to a multimedia work. The ability to repurpose a work in this manner should also provide a considerable advantage in revising works to correct errors or improve the quality of the work.

SUMMARY OF THE INVENTION

In accordance with the present invention, a method is defined for modifying a multimedia work that is recorded on a non-volatile medium when the multimedia work is executed, to repurpose the multimedia work. The multimedia work includes a plurality of objects. The method comprises the step of implementing a data storage manager on a computer that is to execute the multimedia work using machine instructions stored on the non-volatile medium. The data storage manager controls execution of the objects comprising the multimedia work by providing a node through which the data storage manager communicates with the objects and includes at least one data handler for handling the objects. A supplementary data storage medium is provided on which are stored machine instructions that implement a filter for use in modifying the multimedia work.

The machine instructions that implement the filter are transferred to the memory of the computer that is to execute the multimedia work. The filter operates between the node and the data storage manager, modifying a manner in which the data storage manager handles objects in the multimedia work.

The supplementary data storage medium may store at least one of a new object and a page description that will be added to the multimedia work when the multimedia work executes. It is also possible that the supplementary data storage medium may store data defining at least one new object that will replace at least one of the objects comprising the multimedia work that is stored on the non-volatile medium. The filter defines an interaction between the objects comprising the multimedia work that differs from that defined by the data manager stored on the non-volatile medium. Changes in the objects used in the multimedia work and in the interactions between the objects thus accomplish its repurposing.

In the preferred form of the invention, the non-volatile medium comprises a CD-ROM, and the supplementary data storage medium comprises a floppy disk. However, it is also contemplated that the supplementary data storage medium might also comprise a tape, or another CD-ROM. The data storage manager and the data handler comprise a system content management engine. The system content management engine and the filter comprise a modified system content management engine that modifies the manner in which the objects comprising the multimedia work are handled during its execution.

Another aspect of the present invention is directed to a system for enabling a multimedia work stored on a CD-ROM to be repurposed when played. The multimedia work includes a plurality of objects. The system includes a computer on which the multimedia work is executed. The computer comprises a central processing unit (CPU) for executing machine instructions that effect play of the multimedia work on the computer. A CD-ROM drive is included for accessing data defining the multimedia work stored on the CD-ROM, and a random access memory (RAM) stores machine instructions that control how the data stored on the CD-ROM is executed by the CPU. The computer also includes means for reading machine instructions and data from a non-volatile storage medium. A non-volatile storage medium that is compatible for use with the means for reading is provided, and machine instructions for repurposing the multimedia work are stored on the non-volatile storage medium. The machine instructions stored on the non-volatile storage medium are input to the RAM for execution by the CPU when executing the machine instructions stored on the CD-ROM. When executed by the CPU, the machine instructions stored on the non-volatile storage medium modify the multimedia work by intercepting communications between a storage manager and objects comprising the multimedia work to change a manner in which objects defined on the CD-ROM are used. The non-volatile storage medium also includes a list of storage locations for objects that will be used in the multimedia work as modified. Other functions effected by the machine instructions to repurpose the multimedia work are generally consistent with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 3A is a block diagram illustrating functional components of a system content management engine before repurposing of a multimedia work;

FIG. 3B is a block diagram illustrating the functional components of a modified system content management engine after repurposing has occurred;

FIG. 4A (prior art) shows how a system interfaces between objects in a multimedia work;

FIG. 4B (prior art) illustrates an arrangement that permits objects in a multimedia work to directly interact;

DESCRIPTION OF THE PREFERRED EMBODIMENT

Figure 1:
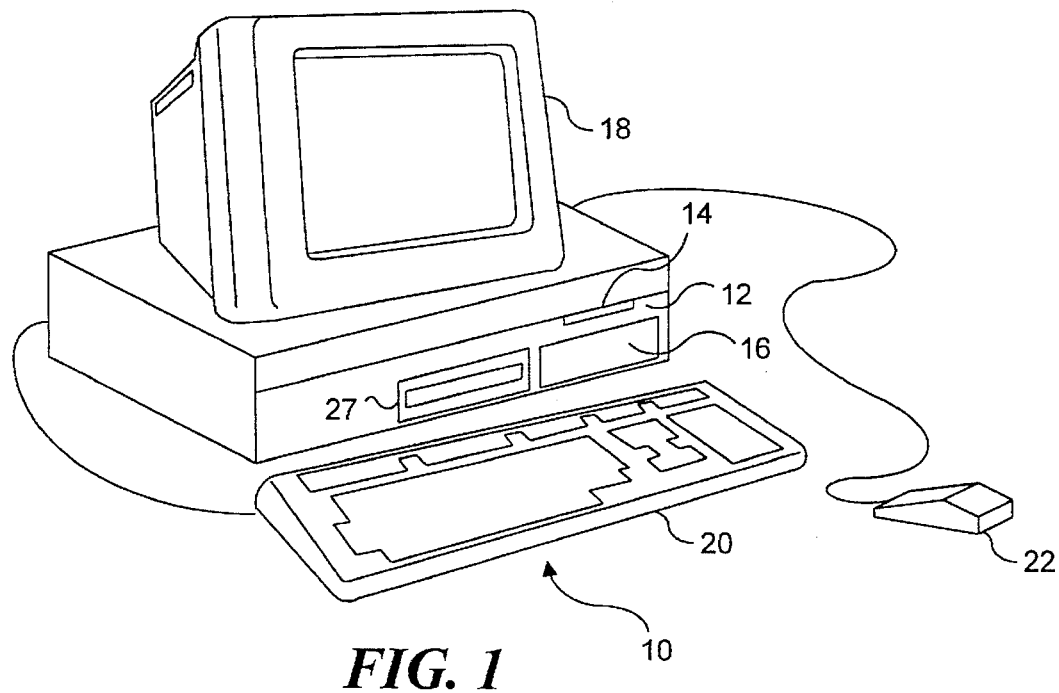
FIG. 1 is an isometric view of a computer system suitable for implementing the present invention.
Figure 2:
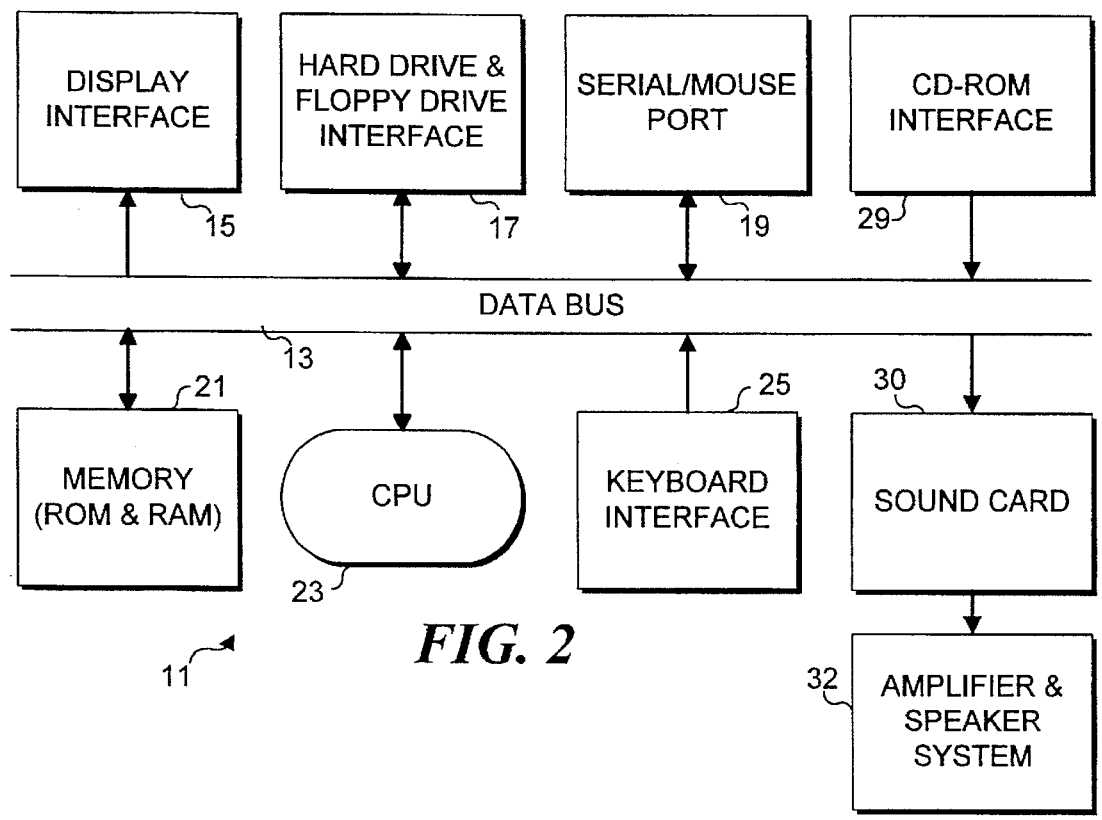
FIG. 2 is a schematic block diagram showing internal components of the computer system in FIG. 1.

With reference to FIG. 1, a personal computer system 10 is illustrated. Personal computer system 10 is suitable for use in creating a multimedia work capable of repurposing, as provided by the present invention, or for developing the files required for repurposing the work, and after the multimedia work has been stored on a CD-ROM, can be used to play the multimedia work, enabling the work to be repurposed in accordance with this invention. Personal computer system 10 is of the multimedia type, i.e., it has the ability to play audio and video data recorded on a CD-ROM that is inserted into a CD-ROM drive 27, but in all respects, is generally conventional in design and employs components typically used in personal computers. The personal computer includes a processor chassis 12 in which most of the circuitry required for operation of the personal computer is provided on a mother board (not separately shown) or on separate circuit boards designed to interface with the mother board by plugging into slots on a data bus 13, which is shown in FIG. 2. Since details of personal computer 10 and of its internal circuitry are well known to those of ordinary skill in the art, there is no need to disclose such details beyond the brief description that follows.

Included within processor chassis 12 is a floppy disk drive 14 that is suitable for recording and playback of a floppy disk (not shown), which is used for non-volatile storage of data and executable files, enabling transfer between personal computers. A hard drive 16 provides non-volatile storage for both machine instructions used in executing applications and data used and created when personal computer system 10 is in operation. Sitting atop processor chassis 12 is a monitor 18, which is preferably capable of displaying graphic images with at least 640×480 pixels resolution, at 256 colors, in order to facilitate creation and/or playback of a multimedia work. Input from a user is provided to control applications executing on personal computer 10, both through a keyboard 20 and a mouse 22 (or other conventional pointing device used for manipulating a cursor on monitor 18). Although personal computer 10 is illustrated as comprising a desktop system, it will be understood that the capabilities required for creating and/or playing a multimedia work are now generally available in a laptop computer and in a workstation coupled to a network. The type of computer employed for repurposing a multimedia work during playback is thus not critical in regard to the present invention. For example, it is contemplated that an IBM™ compatible computer or an APPLE™ computer can be used for repurposing a multimedia work.

As shown in FIG. 2, a schematic block diagram 11 indicates that personal computer 10 includes a CPU 23, which is coupled to data bus 13 to execute machine instructions that have been loaded into a memory 21 from the hard drive or from some other storage media. Although not separately shown, memory 21 comprises both read only memory (ROM) and RAM. ROM is non-volatile and is used for storing instructions that control CPU 23, e.g., when personal computer 10 initially boots up. The RAM portion of memory 21 is loaded with machine instructions comprising an operating system and/or an application selected by the user for execution on personal computer 10 and also serves to temporarily store variables and other data.

Also coupled to data bus 13 are a display interface 15, through which video data are input to monitor 18, a hard drive and floppy drive interface circuit 17, which provides bi-directional data flow to floppy drive 14 and hard drive 16 and is used for controlling these drives, and a serial/mouse port 19 through which mouse 22 or other serial devices communicate with CPU 23. A keyboard interface 25 provides a port for coupling keyboard 20 to data bus 13. Similarly, a CD-ROM interface 29, e.g., a small computer systems interface (SCSI) card enables machine instructions and data stored on a CD-ROM to be input to data bus 13 and thereby loaded into memory 21 for access by CPU 23. Alternatively, other types of interfaces can be used to couple the CD-ROM to the data bus. In addition, a sound card 30 is connected to data bus 13 so that various types of sound data recorded on a CD-ROM can be transferred through data bus 13 from the CD-ROM to the sound card. In response to the sound data, the sound card produces an analog signal that is input to an amplifier and speaker system 32, to produce audible sound.

A preferred embodiment of the present invention is implemented in a SYMMETRY™ multimedia authoring program developed for Microsoft Corporation. The SYMMETRY program enables a multimedia author to create multimedia works by integrating text, sounds, pictures, animations, and videos. This program is designed to operate under a graphic user interface operating system such as Microsoft's WINDOWS™; however, it is contemplated that it can and will be ported to other graphic operating systems, such as that implemented by Apple Corporation.

In the SYMMETRY program, a user creates pages (screens), places "objects" on each page, and indicates by entry of commands how the pages and objects are to be played when the multimedia work is executed. A page is like a sheet in an artist sketch book and can include drawings, photos, captions, text, sound, video, and/or animations. The SYMMETRY program is unusual in that compiling of a multimedia work and text files is NOT required. As the author creates the multimedia work, it can be immediately played back, enabling images to be seen, sounds to be heard, and video and animation objects to be viewed without any delay for compiling. Each multimedia element such as text, sound, images, animations, or videos, is contained within an object. Other objects, such as scroll bars, buttons, and hot spots are used within a multimedia work to control the way that the work plays in response to user input. Commands are used to manipulate the objects on a page. In the SYMMETRY program, the commands provide the author with a powerful command language that is relatively easy to use, since virtually no programming skill is required.

The SYMMETRY multimedia authoring program is provided in two versions, including an authoring (or edit) version and a run-time version. The authoring version includes a menu system and toolbar to assist the author in creating a multimedia work. In contrast, the run-time version is a simple subset of the authoring version, since it does not include the menu and toolbar. A multimedia work is implemented or played with the run-time version in a read-only mode and cannot be altered or edited without using the full authoring version of the SYMMETRY program.

The SYMMETRY program creates a multimedia work that has significant advantages over a conventional multimedia work created with other programs. Typically, multimedia works are created using an authoring program or tool. This authoring program enables the work to be compiled into one or more executable files that are initially stored in a non-volatile memory storage device, such as hard drive 16. Subsequently, the compiled or executable version of the multimedia work is transferred from the hard drive through a CD-ROM recorder (not shown) to a master CD-ROM, which is then used to produce many CD-ROM copies that are distributed to end users for playback of the multimedia work on multimedia computers such as personal computer 10. As noted above, the CD-ROM is a read-only storage device and changes to the multimedia work cannot be made in the compiled playable files that are stored on the CD-ROM, after the CD-ROM is produced.

Unlike most multimedia authoring programs or tools, the SYMMETRY program does not create a compiled playable version of a multimedia work. This facet of the program enables repurposing of the multimedia work so that pages and/or objects can later be added or can replace pages and/or objects originally provided in the multimedia work stored on a CD-ROM. The repurposing occurs during playback of the multimedia work and does NOT require the authoring version of the SYMMETRY program. The changes that can be made to effect repurposing may range between relatively insignificant corrections of bugs or errors in the original multimedia work to the addition of modules that substantially change the nature and content of the multimedia work originally distributed on the CD-ROM.

A comparison of personal computer systems running a CD-ROM multimedia work created using the SYMMETRY program, before and after repurposing, is provided in FIGS. 3A and 3B, respectively. In a block 40 of FIG. 3A, a system running the CD-ROM multimedia work before repurposing is represented. To play a multimedia work created under the SYMMETRY program, the machine instructions comprising the run-time version of the SYMMETRY program are loaded from either the CD-ROM or hard drive 16 into the RAM portion of memory 21. The run-time program can be enabled to automatically begin play of the multimedia work so that the user remains unaware that the SYMMETRY program is controlling play of the work recorded on the CD-ROM. Thus, block 40 represents the playback of the multimedia work controlled by the SYMMETRY run-time version (or the play of the multimedia work under the authoring/editing version when the work is being created). Typically, a number of files are stored on the CD-ROM to implement the multimedia work. Some of these files handle input and output from a plurality of storage managers and storage handlers. Storage handlers are implemented using specific dynamic-link library (*.dll) files that each contain a library of procedures for handling objects of a particular type. Thus, a video storage handler is provided for handling storage and retrieval of all of the videos included in the multimedia work, using a common set of library procedures. The storage manager controls access to each object comprising the multimedia work stored on the CD-ROM or in some other location, such as on hard drive 16. Before repurposing, assuming that the author has not chosen to copy the objects from the CD-ROM onto hard drive 16 to increase the speed of playback, the storage manager and storage handler in a block 42 will access each of the objects 1 through N in their storage locations on the CD-ROM (or on the hard drive), as indicated in blocks 44, 46, and 48.

A file distributed on the CD-ROM is available to the storage manager to define the objects that are to be accessed and the order in which the objects are accessed when the multimedia work plays. This file, which in the preferred embodiment is identified with the extension ".sym," is a text file that contains the name of the storage files associated with the multimedia work, the name of each storage handler associated with a particular type of storage file or object, and any filters associated with the multimedia work. When the multimedia work is initially executed, the SYMMETRY program scans the *.sym file to identify the storage handlers associated with the objects used in the multimedia work, and where those objects are stored. It will be apparent that the ".sym" extension is an identifier for a file that specifies the content and ordering of objects in the multimedia work.

Referring now to FIG. 3B, a block 40' represents the system running the CD-ROM multimedia work after repurposing. Clearly, repurposing the multimedia work requires that any additional or replacement objects/pages or new/modified commands for existing objects/pages be provided for use at the time the multimedia work is played. These new/modified objects are defined by files that are preferably provided on floppy disks to be read by floppy drive 14 of personal computer 10. However, it is also envisaged that more extensive changes can be distributed to end users on an additional CD-ROM and transferred from the repurposing CD-ROM into hard drive 16 for storage therein to be used during playback of the multimedia work originally created.

The other component required for repurposing is a replacement *.sym file, which differs from the *.sym file provided on the CD-ROM on which the original multimedia work is distributed. The modified or repurposed *.sym file contains references to multiple storage handlers and storage objects, and/or additional filters to handle interactions between objects as required to change the multimedia work from its original content and play to the repurposed content and play. A block 42' in FIG. 3B represents a storage manager and the storage handlers that are required for repurposing the multimedia work. An exemplary new object #1 is provided in a block 44', which in the repurposed multimedia work, is implemented prior to the old object #1. Old object #1 becomes new object #2, as indicated in a block 46'. Alternatively, new object #1 might replace old object #1. Similarly, a block 48' indicates that the old object #N has become new object #(N+1). Although this simple example adds only a single new object, it should be apparent that substantial changes can be implemented in this fashion to greatly modify the repurposed multimedia work when it is played. By loading a modified *.sym to replace the previous *.sym file that was shipped with the multimedia work stored on the original CD-ROM, the changes required in the repurposed multimedia work are seamlessly implemented when the multimedia work is played.

The ability to repurpose a multimedia work in this manner is in part due to an improved mechanism for handling interactions between the system and the various objects comprising the multimedia work. FIGS. 4A and 4B illustrate two different prior art approaches used for handling the interactions between objects A and B. As shown in FIG. 4A, a system represented by a block 60 directly communicates with object A, which is represented by a block 62, and with object B, which is represented by a block 64. Communication may be bi-directional in the sense that an object may provide input to the system when a multimedia work that includes the two objects is played. Any filtering that occurs relative to the communications between the two objects, as represented by a loop 66, is carried out by the system of block 60, independent of its interactions with object A and object B.

In FIG. 4B, object A, which is represented by a block 70, communicates directly with object B, represented by a block 72, so that interactions between the two objects are handled directly, without interfacing with the system. In this prior art approach, there is no provision for filtering the interaction of the system with each object or for filtering interactions between the objects, since they interact directly.

Figure 5:
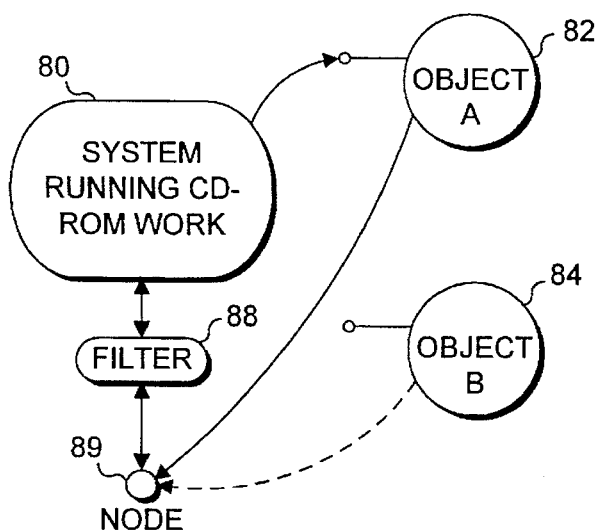
FIG. 5 is a block diagram illustrating how the present invention handles objects of a multimedia work to enable repurposing of the work to occur.

With reference to FIG. 5, the technique for handling objects implemented by the present invention under the SYMMETRY program is illustrated. A block 80 represents the system running the multimedia work stored on the CD-ROM. The system can communicate directly with object A, represented by a block 82, as indicated by the direct interconnection between the two. However, communications from object A to the system are not handled through a direct connection. Instead, object A communicates with system 80 through a node 89. Node 89 is in bi-directional communication with a filter 88, which in turn is in bi-directional communication with the system represented by block 80. Filter 88 modifies the normal interaction of object A with the system based upon commands provided by the author of the multimedia work. It should be noted that filters can be linked together sequentially to enable several filters to be used simultaneously. Filter 88 comprises a filter handler that can be included with the original multimedia work and/or provided or replaced with a filter handler stored on the repurposing floppy disk (or tape, or CD-ROM) used to repurpose the original multimedia work. Since the filter is implemented at run time, i.e., when the multimedia work is played, repurposing of the objects that communicate through the filter is readily achieved. For example, object B, which is shown in a block 84, can be added to repurpose the multimedia work, since the new object communicates with the system through node 89. Its interaction with object A and with the system in block 80 can be modified by providing an appropriate filter handler to replace the original filter 88.

Figure 6:
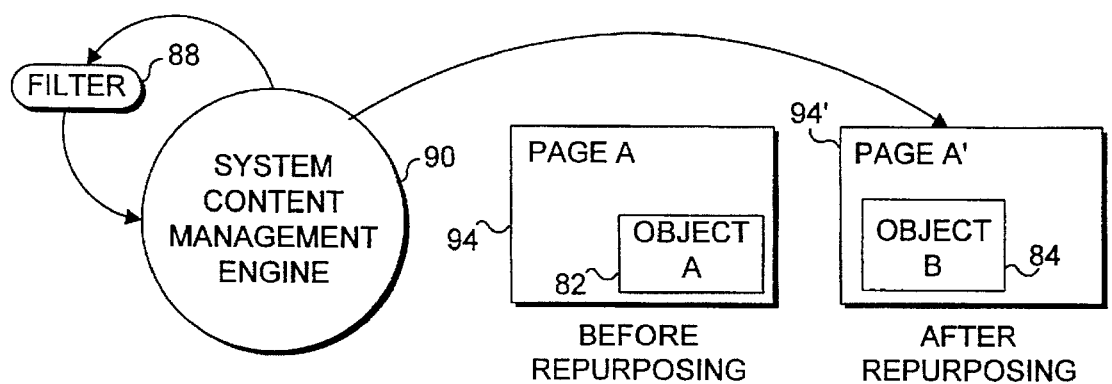
FIG. 6 is a block diagram illustrating how repurposing modifies the objects that appear on a page in a multimedia work.

As shown in FIG. 6, the storage manager and various storage handlers in the system comprise a system content management engine represented by a block 90. The system content management engine controls the integration and interplay between objects, and the order in which they are used in the multimedia work. Further, since the system content management engine responds to the order in which objects are listed in the *.sym file, replacing the original *.sym file with the repurposed *.sym file readily enables modification of the multimedia work at run time.

Alternatively, the *.sym file can be edited to modify the multimedia work. In the example shown in FIG. 6, before repurposing, a page A, represented in a rectangle 94 includes object A (in a block 82). Object A might, for example, comprise a video running on page A. After repurposing, due to changes in the *.sym file, the system content management engine represented by block 90 implements a page A' that is indicated by a rectangle 94'. Page A' uses object B, represented by a block 84. Object B may comprise, for example, a different video that will replace video object A. Filter 88 may provide for modifications of the command to initiate the play of object B, for example, causing object B to be executed when the user initiates display of page A'. Although this example is simplistic, it illustrates how changes and additions to an existing multimedia work are easily implemented during execution of the multimedia work to achieve repurposing.

Figure 7:
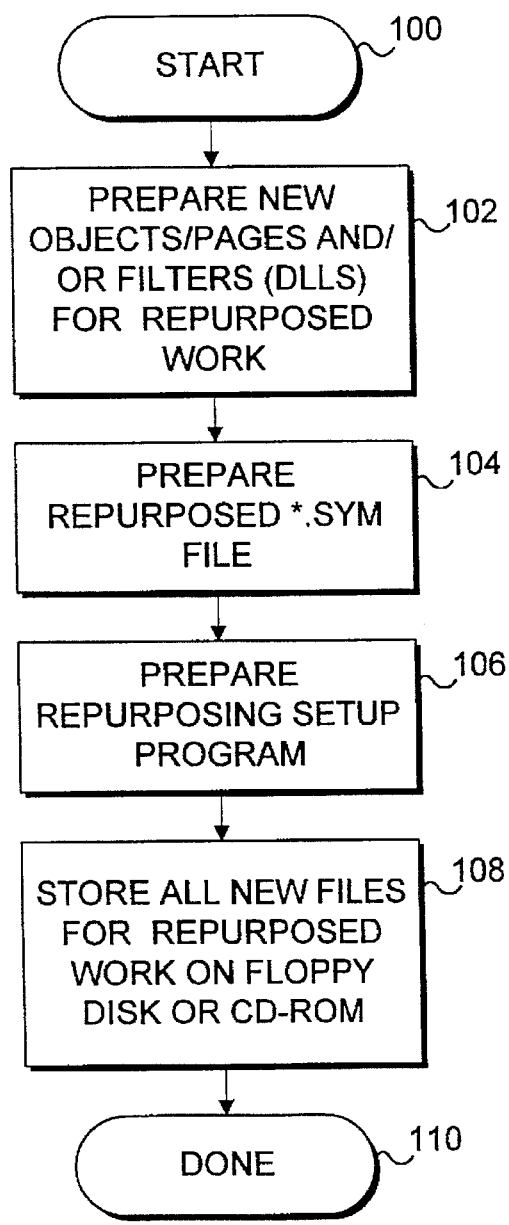
FIG. 7 is a flow chart showing the steps implemented to repurpose a multimedia work.

In FIG. 7, the steps implemented in producing the files necessary for repurposing an existing multimedia work originally created under the SYMMETRY program are illustrated, beginning at a start block 100. In a block 102, the author prepares new objects/pages and/or filters (.dll files) that will be used for repurposing the multimedia work. In a block 104, a modified *.sym repurposing file is prepared in which changes to the pages/objects used in the multimedia work are indicated by adding, deleting, and/or changing the objects previously listed. In fact, the steps implemented in blocks 102 and 104 are carried out using the authoring version of the SYMMETRY program to modify the original multimedia work. The new files that are created thereby, and the revised *.sym file are then used for repurposing the multimedia work originally stored on the CD-ROM that was distributed to a user. In a block 106, the author prepares a repurposing setup program, which is typically a batch or other executable file that will handle copying the new files required for repurposing a multimedia work to the user's hard drive from one or more floppy disks, and replacing the original *.sym file with the repurposing *.sym file. The new files that are required for repurposing the multimedia work are then transferred to a master floppy disk or CD-ROM in a block 108, from the author's hard drive. The master floppy disk or repurposing CD-ROM will then be used to produce the repurposing disks or CD-ROMs that will be distributed to the end users so that each user can repurpose the multimedia work when it is played from the original distribution CD-ROM. The preparation of the repurposing files is complete in a block 110.

When a multimedia work can be repurposed by replacing a first object in the existing multimedia work with a second object having the same label or name as the first object, a filter is not required. Due to the hierarchical nature of storage objects in SYMMETRY, the storage handler used to access objects employed in the multimedia work can implement this type of repurposing without use of a filter. Specifically, a replacement or edited *.sym file will reference a storage for each object that is to replace a corresponding object in the existing multimedia work, to produce the repurposed multimedia work. Since the reference to the replacement object in the revised *.sym file has precedence over any subsequent reference to the original object in the existing multimedia work, the replacement object will always be used instead of the original object. Each replacement object must be referenced by the same label or name used in the existing multimedia work for the corresponding object that is to be replaced. An object replacing another object in the existing multimedia work need not be of the same type or class as the object that is being replaced. Thus, for example, a wave audio object can replace a MIDI audio object, or a bitmap object can be replaced by an animation object. Once the replacement object has been instantiated, any subsequent reference to an object having its name or label will cause the replacement object to be used instead of the object originally provided in the existing multimedia work. The files required on the storage medium used to create the repurposed work will typically include the storage for the replacement objects and the revised *.sym file. However, a filter will be included on the storage medium if objects are being added or deleted from the existing multimedia work and/or if changes are being made to the work beyond direct replacement of one object by another of the same name or label.

Figure 8:
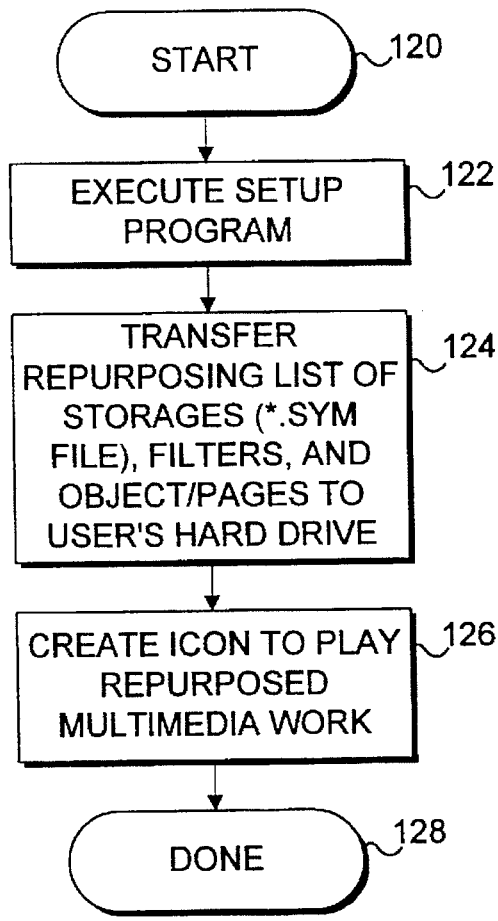
FIG. 8 is a flow chart showing the logical steps involved to enable a user to repurpose a multimedia work.

The steps implemented to install the required files and execute repurposing of a multimedia work are illustrated in FIG. 8, beginning at a start block 120. In a block 122, the user executes the repurposing setup program provided on the floppy disk or CD-ROM used for distributing the files required for repurposing. In a block 124, the setup program implements transfer or copying of the repurposing files, i.e., storage of the new objects/pages or modules used to replace and/or add to existing portions of the multimedia work, including the filters, and the storage information and listing of the objects used in the order that will be implemented during play of the repurposed multimedia work. The data for repurposing are included in the repurpose *.sym file. These files are all copied to the user's hard drive from the distribution floppy disk(s) or repurposing CD-ROM.

As indicated in a block 126, it is contemplated that the setup program will create an icon that can be selected by the user to play the repurposed multimedia work. Associated with the icon is the path to the SYMMETRY run-time program that will be executed to play the multimedia work, followed by the complete path (and name) for the repurposing *.sym file on the user's hard drive that will be implemented instead of the original *.sym file provided on the CD-ROM used to distribute the multimedia work. When the icon is selected, i.e., by double clicking on it, the run-time SYMMETRY program will begin executing the multimedia work as specified by the repurposing *.sym file. Once these steps have concluded, the setup program terminates in a block 128.

Figure 9:
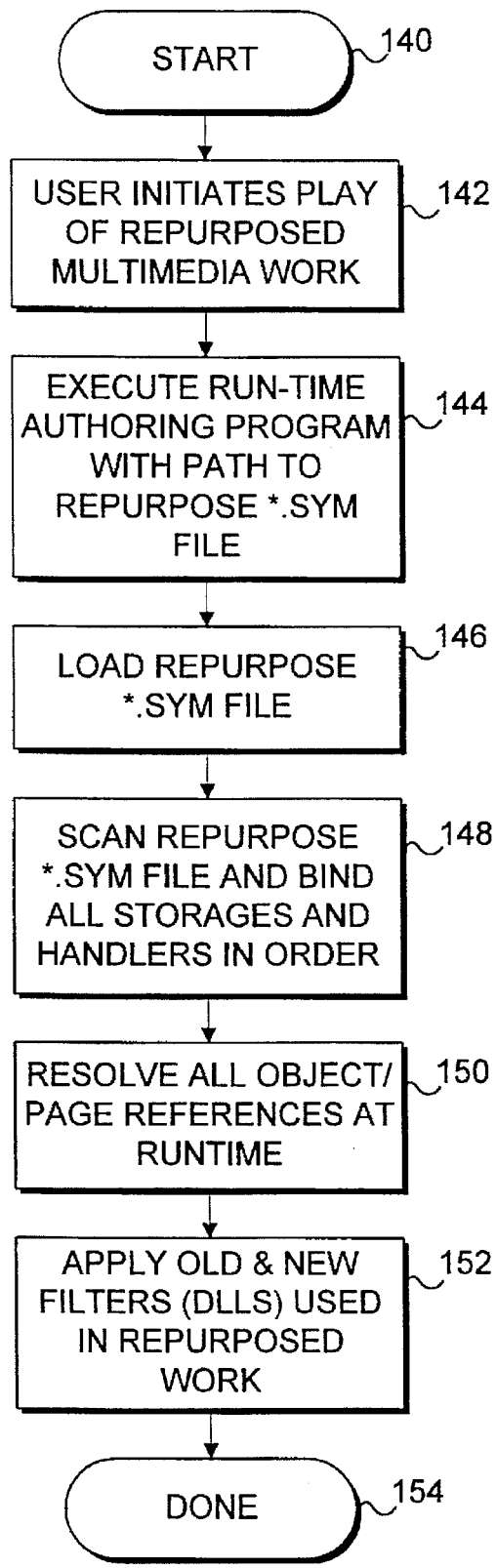
FIG. 9 is a flow chart showing the logical steps executed when repurposing a multimedia work.

Finally, the steps that lead to repurposing the multimedia work stored on a CD-ROM using the repurposing files are implemented as shown in the flow chart of FIG. 9, beginning at a start block 140. In a block 142, the user initiates play of the repurposed multimedia work by selecting (double clicking) the icon created in block 126 of FIG. 8. Next, in a block 144, the run-time SYMMETRY authoring program begins executing. This program loads the repurposed *.sym file that was copied onto the hard drive into memory, in a block 146. In a block 148, the run-time SYMMETRY program scans the repurposed *.sym file so that the path to all objects/pages commands, filters, and other components in the repurposed multimedia work and their order of play are made available to the run-time SYMMETRY program. In addition, the run-time authoring program binds the appropriate object handlers to the objects at the storage locations indicated in the *.sym file and in the order listed in that file. During play of the repurposed multimedia work, as noted in a block 150, the run-time program resolves all object/page references so that the appropriate objects are instantiated on each page at the appropriate time. A block 152 provides for applying the old filters that are retained and any new filters (.dlls) that are used in the repurposed multimedia work. Once play of the multimedia work is completed, the logic concludes in a block 154.

The present invention is implemented using the SYMMETRY authoring program; however, it will be apparent that this invention can be used in other types of programs. Unlike prior art programs that "hard wire" all references to data elements, pages, objects, and other elements, the present invention provides for late binding of the objects with the appropriate handlers, for storage or filtering, thereby providing considerable latitude for the modification, replacement, and addition of components to a work. In contrast, a work that is compiled, distributed to end users, and then executed in its compiled form by the end users is bound by the source code used to create the compiled version of the program and cannot be modified at run time in the manner disclosed above in order to achieve repurposing. In the SYMMETRY program, references to pages, objects, and other data elements are based upon an I.D. that is mapped at run time to a particular data address within some storage, either on the original CD-ROM, or in the user's hard drive or floppy drive. Since this mapping is done at run time, not at authoring time, references and interactions between objects are readily redirectable. Furthermore, since filters are applied to system messages conveyed between objects and the system (or run-time program) before the system actually implements the messages or sees them, the flow of control in the multimedia work is easily changed by replacing or adding filters. Accordingly, the extent to which a multimedia work can be modified is virtually unlimited. Consequently, substantial savings can be achieved in modifying a pre-existing multimedia work, permitting much of the original multimedia work to be used and adding or changing only those elements desired, at run time.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A method for modifying a multimedia work that is recorded on a non-volatile medium when the multimedia work is executed, to repurpose the multimedia work, said multimedia work comprising a plurality of objects, comprising the steps of:
    (a) implementing a data storage manager in a computer that is to execute the multimedia work using machine instructions stored on the non-volatile medium, said data storage manager controlling execution of the objects comprising the multimedia work including at least one data handler for handling the objects;
    (b) providing a supplementary data storage medium on which is stored machine instructions that implement a filter for use in modifying the multimedia work; and
    (c) transferring said machine instructions that implement the filter to the memory of the computer that is to execute the multimedia work for execution by the computer, said filter operating in combination with the data storage manager to modify a manner in which the data storage manager handles objects in the multimedia work.

2. The method of claim 1, wherein the supplementary data storage medium stores at least one of a new object and a page description that will be added to the multimedia work when the multimedia work executes.

3. The method of claim 1, wherein the supplementary data storage medium further stores data defining at least one new object that will replace at least one of the objects comprising the multimedia work stored on the non-volatile medium.

4. The method of claim 1, wherein the filter defines an interaction between the objects comprising the multimedia work that differs from an interaction defined by the data manager stored on the non-volatile medium.

5. The method of claim 1, wherein the non-volatile medium comprises a CD-ROM, and wherein the supplementary data storage medium comprises one of a supplementary CD-ROM, a tape, and a floppy disk.

6. The method of claim 1, wherein the supplementary data storage medium comprises a file that lists the objects that will be used in the multimedia work as modified and their storage, and wherein the data storage manager and said at least one data handler comprise a system content management engine, said filter and said system content management engine comprising a modified system content management engine that modifies the manner in which the objects comprising the multimedia work are handled during execution of the multimedia work.

7. A method for modifying a multimedia work that is recorded on a non-volatile medium when the multimedia work is executed, to repurpose the multimedia work, said multimedia work comprising a plurality of objects, comprising the steps of:
    (a) on a storage medium, distributing:
        (i) a supplementary storage object that includes a replacement object to replace one of the plurality of objects comprising the multimedia work, said replacement object being referenced by a label that is identical to that used by said one of the plurality of objects to be replaced; and
        (ii) a modified storage definition file that includes references to storage handlers and storage objects that will be included in the multimedia work after it is repurposed, and a reference to the replacement object; and
    (b) instantiating the replacement object to repurpose the multimedia work, so that the replacement object has precedence over said one of the plurality of objects to be replaced.

8. A method for repurposing a multimedia work that is stored on a CD-ROM, when the multimedia work executes on a computer, said multimedia work comprising a plurality of objects and a system content management engine for controlling the objects, said method comprising the steps of:
    (a) providing a modified system content management engine for controlling the objects in a different manner than provided on the CD-ROM;
    (b) replacing the system content management engine with the modified system content management engine; and
    (c) controlling the objects comprising the multimedia work in the different manner using the modified system content management engine, when the multimedia work executes on the computer.

9. The method of claim 8, wherein the modified system content management engine references:
    (a) the objects used in the multimedia work as modified to repurpose it; and
    (b) storage locations for said objects.

10. The method of claim 8, further comprising the step of providing at least one object for modifying the multimedia work, said at least one object being used by the modified system content management engine when executing the multimedia work on the computer.

11. The method of claim 10, wherein said at least one object for modifying the multimedia work replaces at least one of the objects comprising the multimedia work as defined on the CD-ROM.

12. The method of claim 10, wherein said at least one object for modifying the multimedia work is in addition to the objects comprising the multimedia work stored on the CD-ROM.

13. The method of claim 10, wherein objects comprising the multimedia work interact only through a node provided by the modified system content management engine and do not communicate directly with each other or with the modified system content management engine, further comprising the step of providing a filter between the node and the modified system content management system to modify interactions with the objects in order to repurpose the multimedia work.

14. The method of claim 10, wherein the modified system content management engine enables at least one new module to be integrated in the multimedia work during its execution to repurpose the multimedia work stored on the CD-ROM.

15. A system for enabling a multimedia work stored on a CD-ROM to be repurposed when played, said multimedia work comprising a plurality of objects, comprising:

(a) a computer on which the multimedia work is executed, said computer including:
   (i) a central processing unit for executing machine instructions that effect play of the multimedia work on the computer;
   (ii) a CD-ROM drive for accessing data defining the multimedia work stored on the CD-ROM;
   (iii) a random access memory for storing machine instructions that control how the data stored on the CD-ROM is executed by the CPU; and
   (iv) means for reading machine instructions and data from a non-volatile storage medium; and (b) a non-volatile storage medium that is compatible for use with the means for reading, machine instructions for repurposing the multimedia work being stored on the non-volatile storage medium, said machine instructions on the non-volatile storage medium being input to the random access memory for execution by the central processing unit when executing the machine instructions stored on the CD-ROM to effect play of the multimedia work, and when executed by the central processing unit, modifying the multimedia work by using different objects to repurpose the multimedia work, said non-volatile storage medium also including storages for objects that will be used in the multimedia work as modified.

16. The system of claim 15, wherein the machine instructions stored on the non-volatile medium, when executed by the central processing unit, define a filter for handling communications between the objects comprising the multimedia work as modified and the central processing unit, to repurpose the multimedia work as it plays.

17. The system of claim 16, wherein the machine instructions stored on the non-volatile medium, when executed by the central processing unit, comprise at least one new object that is not included among the plurality of objects comprising the multimedia work stored on the CD-ROM.

18. The system of claim 15, wherein the machine instructions stored on the CD-ROM, when executed by the central processing unit, provide a node for communications between the plurality of objects and a storage manager that controls the objects used in the multimedia work.

19. The system of claim 15, wherein the means for reading comprise a floppy disk drive, and wherein the non-volatile storage medium compatible with the means for reading comprise a floppy disk.

20. The system of claim 15, wherein the non-volatile storage medium includes a file having an identifier identical to that of a file stored on the CD-ROM, said file on the non-volatile storage medium replacing the file stored on the CD-ROM in the random access memory, for execution by the central processor, to repurpose the multimedia work.

21. The system of claim 15, wherein the non-volatile storage medium comprises another CD-ROM.

22. An article of manufacture that is adapted to be used with a computer for repurposing a multimedia work that is stored on a CD-ROM when the work is played, comprising:

a memory medium separate from the CD-ROM on which is stored data defining at least one object and a plurality of machine instructions that are executable by a computer, said machine instructions:
   (a) modifying and repurposing the multimedia work when it is played by the computer, by incorporating objects that differ from the objects of the multimedia work that is stored on the CD-ROM; and
   (b) providing a list of storage locations for the objects that will used in the multimedia work, as thus modified, including the storage locations for those object defined by the data stored on the memory medium.

23. The article of manufacture of claim 22, wherein the machine instructions define a filter for handling communications between the objects comprising the multimedia work as modified, to repurpose the multimedia work as it plays.

24. The article of manufacture of claim 22, wherein at least one new object is defined by the data stored on the memory medium that is not included among the plurality of objects comprising the multimedia work stored on the CD-ROM.

25. The article of manufacture of claim 22, wherein the memory medium comprises one of a floppy disk, a tape, and a supplementary CD-ROM.

* * * * *